United States Patent [19]

Sterzel

[11] Patent Number: 4,824,878
[45] Date of Patent: Apr. 25, 1989

[54] COMPOSITES OF THERMOPLASTIC POLYMERS AND SILICA REINFORCING FIBERS

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 61,655

[22] Filed: Jun. 15, 1987

[30] Foreign Application Priority Data

Jun. 25, 1986 [DE] Fed. Rep. of Germany ....... 3621206

[51] Int. Cl.$^4$ ............................................. C08K 3/36
[52] U.S. Cl. ..................................... 523/307; 524/492; 524/493
[58] Field of Search ................. 524/492, 493; 523/307

[56] References Cited

U.S. PATENT DOCUMENTS

| | | | |
|---|---|---|---|
| 4,332,601 | 6/1982 | Degerhoff et al. | 65/2 |
| 4,481,322 | 11/1984 | Godlewski et al. | 524/583 |
| 4,722,952 | 2/1988 | Hatt | 524/493 |
| 4,731,294 | 3/1988 | Pouchoi et al. | 524/493 |
| 4,752,630 | 8/1986 | Sterzel | 523/307 |

Primary Examiner—George F. Lesmes
Assistant Examiner—James B. Monroe
Attorney, Agent, or Firm—Keil & Weinkauf

[57] ABSTRACT

Composites of heat-stable thermoplastic polymers and silica reinforcing fibers having diameters of less than 1000 nm are prepared by polycondensation of silicic acid or polysilicic acid in the melt or solution of the thermoplastic under the influence of a high shear gradient. The silicic acids or polysilicic acids are salted out from aqueous solution in order to transfer then to an organic solvent, which is also a solvent for the thermoplastic.

10 Claims, No Drawings

COMPOSITES OF THERMOPLASTIC POLYMERS AND SILICA REINFORCING FIBERS

It is known that plastics can be provided with reinforcing fibers, such as glass fibers or carbon fibers, or crystalline inorganic fibers based on titanates, alumina or silicon carbide, in order substantially to increase the rigidity and strength of these plastics.

It is also known that the mechanical properties of the composite are improved as the fiber diameter decreases. For example, the breaking strength and toughness increase, the notched impact strength increases because the notch effect of the reinforcing fibers decreases with decreasing diameter, and the composite strength increases with the resulting increase in surface area. Moreover, the strength of the reinforcing fibers themselves increases because the proportion of surface defects decreases with decreasing diameter (D. W. von Krevelen, Kautschuk +Gummi, Kunststoffe 37th year, no. 4/84, page 295).

However, considerable problems are encountered in the consequent efforts to reduce the diameter of the reinforcing fibers as far as possible. For example, it is technically impossible for single filaments having diameters of less than 5 μm to be handled without damage. Inorganic fibers having diameters of about 1 μm or less can cause dangerous diseases of the respiratory organs when these fibers are handled freely.

For these reasons, the only fibers employed in practice to date are those having diameters greater than 3 μm(=3000 nm).

In U.S. patent application Ser. No. 901,580 now U.S. Pat. No. 4,752,630, the object of introducing inorganic fibers having diameters of less than 1 μm into polymers is achieved by producing the fibers in the solution or melt of the matrix polymer by hydrolysis of reactive organometallic compounds under the influence of a high shear gradient.

The organometallic compounds used there are, in particular, aluminum alkoxides. This essentially elegant method has the disadvantage that only about 10-20 parts of alumina are produced from 100 parts of the aluminum alkoxides used there; the remainder has to be vaporized as alcohol after the hydrolysis. To date, it has been impossible to overcome this disadvantage in the preparation of alumina fibers in polymers.

In the novel process, however, it is possible, starting from waterglass or sodium metasilicate, to prepare appropriate fibers of silica directly in the polymer, the fiber diameter being less than 1000 nm and the length-/diameter ratio exceeding 10. Although silica fibers possess less rigidity and strength than alumina fibers, they have the advantage of a lower density, i.e. 2.2 g/cm$^3$ compared with 3.9 g/cm$^3$ for alumina, so that the density-related properties are only slightly inferior to those of alumina.

In the novel process, a solution of silicic acid and/or polysilicic acid in an organic solvent, which is also a solvent for the matrix polymer, is prepared, and the SiO$_2$ fibers are produced in the polymer while increasing the temperature and under the influence of shearing forces, the solvent being distilled off at the same time.

The present invention relates to composites of thermoplastic polymers and silica reinforcing fibers which have diameters of less than 1000 nm and are produced by condensation of silicic acid and/or polysilicic acid or by hydrolysis and subsequent condensation of polysilicates in a homogeneous organic phase in the presence of the thermoplastic polymer under the influence of a high shear gradient.

The transfer of silicic acid and/or polysilicic acid from aqueous solution to an organic solvent by salting out, and possible subsequent esterification of the silicic acid and/or polysilicic acid to increase the shelf life and thermostability, are described in, for example, U.S. Pat. Nos. 2,395,880 and 2,408,654 and in J. Polym. Sci., Polym. Chem. Ed., 21 (1) (1983), 41-53.

For this purpose, waterglass or sodium metasilicate is diluted with water until the SiO$_2$ content is about 10% by weight. This solution is run slowly into sulfuric acid of about 7-8% strength, while stirring vigorously, until the pH of the solution has fallen to 1.7-2. The resulting sol can immediately be transferred to the organic phase, virtually completely monomeric orthosilicic acid being obtained.

However, the sol may also be left to age for from 1 to 5 hours, polysilicic acids being formed by polycondensation, and the polysilicic acids can then be transferred to the organic phase.

Suitable organic phases are solvents which are capable of forming hydrogen bond compounds with the silicic acid or the polysilicic acids and at the same time are good solvents for the matrix polymer. These are, in particular, compounds which possess O and/or N atoms capable of forming hydrogen bonds. Such compounds are aliphatic polyethers, such as
  diethylene glycol monobutyl ether
  ethylene glycol monobutyl ether
  diethylene glycol monoethyl ether
  diethylene glycol monomethyl ether
  ethylene glycol monoethyl ether
  ethylene glycol monomethyl ether or amides, such as
  N,N-dimethylacetamide
  N-methylpyrrolidone
  N-cyclohexylpyrrolidone or
  sulfolane
  diphenyl sulfone or
  triphenyl phosphite
  triphenyl phosphate
  tricresyl phosphate.

To salt out the mono- and/or polysilicic acids, about 30 parts of sodium chloride and about 10 parts of the organic solvent are added to about 100 parts of the aqueous sol. After thorough stirring at room temperature, from 60 to 100% of the silicic acid passes over into the organic phase, which is separated off from the aqueous phase.

In a variant of the novel process, the resulting organic solution is used directly to dissolve the matrix polymer. After the matrix polymer has been dissolved in the common solvent, the common solution of mono- and/or polysilicic acids and matrix polymer is fed to an extruder, the novel materials being prepared with simultaneous heating, shearing and stripping-off of the solvent and water of reaction.

Particularly suitable matrix polymers are those which can be processed at above 250°-300° C., e.g. nylon 6, polysulfones, polyethersulfones, polyamidoimides, aromatic polyetherimides, aromatic polyetherketones and aromatic polyesters.

The ratio of polymer to silicic acids is adjusted so that the ready-prepared composite contains from 1 to 80, preferably from 5 to 50, % by volume of SiO$_2$.

Since silicic acids can condense rapidly on heating, premature separation of globular and hence undesirable polysilicic acids may occur in the procedure described. This is avoided in a second, preferred variant, in which the silicic acid or polysilicic acid present in the organic phase is additionally esterified with a monohydric alcohol.

For this purpose, a superstoichiometric amount of the alcohol, e.g. n-propanol, n-butanol or tert-butanol, is added to the organic phase, and the esterification is carried out at from 50° to 150° C. while stirring. The water of reaction is first removed under reduced pressure and at an appropriately low temperature, and the alcohol also distilled is recycled. The water of reaction can also be removed using an entraining agent, such as toluene or chlorobenzene. The temperature is increased in the course of the reaction, and the reaction is continued until no further water of reaction is formed; thereafter, the excess alcohol and any entraining agent are distilled off from the higher boiling solvent, the temperature being increased further.

The matrix polymer is dissolved in the resulting solution of esterified silicic acids and/or polysilicic acids, and the solution is fed to the extruder in the manner described.

However, it is also possible to pump the solution of the esterified silicic acids directly into the extruder, where it can be mixed with the polymer melt.

In contrast to the first version, it is also necessary to feed water into the extruder in order to hydrolyze the esterified silicic acids in the absence of the matrix polymer and thus liberate the silicic acids, which form $SiO_2$ fibers having diameters of less than 1 pm under the influence of the shear gradient.

The water can be fed in as a mixture with an organic solvent in order that the water concentration at the entrance can be kept low and premature precipitation of the $SiO_2$ as a result of an excessively high water concentration can be avoided. The water required for hydrolysis can also be fed in as steam.

It is important that at least the final phase of devolatilization takes place in the extruder under shear gradients of from 50 to 5,000 $s^{-1}$, preferably from 100 to 1,000 $s^{-1}$. The temperature is increased to above 250° C., preferably to 300°–400° C., because such high temperatures are advantageous for virtually complete condensation of the silicic acids. The residence time in this temperature range is from 1 to 100, preferably from 1 to 15, minutes.

Under the influence of the shear gradient, the colloidal polysilicic acid particles are brought into fibrous form, which is associated with an increase in the surface energy. The polysilicic acid apparently attempts to avoid this thermodynamically unfavorable form by further condensation.

Complete removal of the solvent gives a melt which can be granulated. After extrusion, cooling, granulation and drying, the granules can be processed by the conventional methods for processing plastics, by means of injection molding, extrusion, blow molding, deep drawing or spinning to give shaped articles, profiles, films, hollow articles, fibers or coatings.

EXAMPLE 1

A. Waterglass having a density of 1.37 $g/cm^3$ is diluted with water until the solution contains 10% of $SiO_2$. 500 parts by weight of this solution are slowly run into 380 parts by weight of a 7.4% strength sulfuric acid, while stirring vigorously. A silica sol having a pH of 1.8 is formed. The sol contains 60 g of $SiO_2$ per liter. It is aged for one hour to form polysilicic acids. 100 parts by weight of tricresyl phosphate and 300 parts by weight of sodium chloride are added to 1000 parts by weight of this sol, and the mixture is then stirred thoroughly for one hour. After stirring has ended, the phases separate within ½ hour, and the organic phase contains about 30 parts by weight of $SiO_2$ per 100 parts by weight of organic phase.

B. 500 parts by weight of a polysulfone based on bisphenol A and 4,4'-dichlorodiphenyl sulfone and having a relative viscosity of 1.57, measured on a 1% strength solution in N-methylpyrrolidone at 25° C., are dissolved in 1000 parts by weight of the organic phase from Experiment A at 40° C. in a stirred kettle. The resulting solution of polysilic acid and polysulfone in tricresyl phosphate is pumped into a twin-screw extruder. The extruder consists of four zones, and the solution is metered into the first heating zone. The heating zones are heated at 280° C., 300° C., 320° C. and 330° C. The second and third heating zones are equipped with devolatilization domes, from which the tricresyl phosphate and water of reaction are distilled off under from 30 to 40 mbar. To generate a high shear gradient, parts of the second and third heating zones are equipped with kneading elements. The first and fourth heating zones contain conveying elements which avoid a breakdown in the vacuum.

The screw speed is set at 250 rpm (shear gradient about 400 $s^{-1}$), and the solution is conveyed at a rate of 14 kg/h.

The polymer extrudate is taken off at the extruder exit, passed through a water bath and granulated.

The polysulfone thus obtained contains about 25% by volume of silica (corresponding to about 37% by weight) in the form of fibers having a diameter of about 15 nm and a length of about 300 nm, corresponding to an l/d ratio of 20.

EXAMPLE 2

500 parts by weight of n-butanol and 300 parts by weight of toluene are added to 1000 parts by weight of the organic solution from Experiment A. This mixture is distilled under reduced pressure (about 30 mbar) at about 40° C., the entrained water of reaction being separated off. After the major part of the water of reaction has separated off over a period from 8 to 10 hours, the pressure and temperature are increased continuously in the course of from 2 to 3 hours until the mixture boils at about 145° C. under atmospheric pressure.

When no further water has distilled off after a further 5 hours, the excess n-butanol and toluene are separated off. In the final phase of the distillation, the pressure is reduced in order to separate off residues of n-butanol and toluene. The degree of esterification of the resulting n-butyl polysilicate is about 90–95%.

400 parts by weight of a polyethersulfone obtained from 4,4'-dichlorodiphenyl sulfone and 4,4'-dihydroxydiphenyl sulfone, having a relative viscosity of 1.54, measured on a 1% strength solution in N-methylpyrrolidone at 25° C., are dissolved in 1000 parts by weight of the resulting solution of a polysilicic acid esterified with n-butanol in tricresyl phosphate, in a stirred kettle at 120° C. The polyethersulfone has a water content of less than 0.01%. The combined solution of the esterified polysilicic acid and the polyethersulfone in tricresyl phosphate is fed to a twin-screw extruder via a gear pump.

The extruder consists of six heating zones, the said solution being metered into the first zone, steam at about 200° C. and under 16 bar being metered into the second zone via a flow control valve, and the fourth and fifth heating zones each possessing a devolatilization dome through which the tricresyl phosphate and excess steam are removed under about 40–60 mbar. The third, fourth and fifth heating zones contain kneading elements which ensure a high shear gradient and intensive surface regeneration. The temperature profile of heating zones 1 to 6 corresponds to 250° C., 250° C., 300° C., 330° C., 360° C. and 390° C. The screw speed is set at 250 rpm (shear gradient about 400 $s^{-1}$), and the solution is conveyed at a rate of 16 kg/h and the steam at a rate of about 2.5 kg/h.

The polymer extrudate taken off is passed through a water bath and granulated. The resulting polyethersulfone contains about 32% by volume of silica (corresponding to about 43% by weight) in the form of fibers having a diameter of 10 nm and a length of 300 nm, corresponding to an l/d ratio of 30.

EXAMPLE 3 (Comparison)

A polyethersulfone (relative viscosity 1.54, measured in 1% strength solution in N-methylpyrrolidone at 25° C.) is mixed with glass fibers at 370° C. by compounding in a twin-screw extruder. The fiber content of the compounded polymer is 40% by weight, and the maximum fiber diameter is 15 μm.

Results

Test specimens for the tensile test according to DIN 53,455 (strength) and DIN 53,457 (rigidity, modulus of elasticity) are prepared from the dry granules on a screw injection molding machine. The melt temperature for the material from Example 1 is 320° C., and that for the other Examples is 360° C.

The Table below gives the results of the measurements, which show that the novel polymer materials are far superior to the prior art comparison material.

| Example | Fiber | Fiber content % by weight | Tensile strength MPa | Modulus of elasticity GPa |
|---|---|---|---|---|
| 1 | SiO$_2$ | 37 | 1400 | 38 |
| 2 | SiO$_2$ | 43 | 1800 | 48 |
| 3 (Comparison) | Glass | 40 | 165 | 13 |

I claim:

1. A composite of a thermoplastic polymer having a softening point above 150° C. and containing from 1 to 80% by volume of silica reinforcing fibers, wherien the fibers have diameter of from 1 to less than 1000 nm and a length/diameter ratio of greater than 10 and are produced in a homogeneous organic phase in the presence of the thermoplastic polymer under the influence of a high shear gradient of from 50 to 5000 $S^{-1}$
    (a) by condensation of silicic acid and/or polysilicic acid or
    (b) by hydrolysis and subsequent condensation of polysilicates.
2. A composite as claimed in claim 1, wherein the silica fibers have diameters of from 1 to 100 nm.
3. A composite as claimed in claim 1, wherein the silica fibers have a length to diameter ratio of from 5 to 1000.
4. A composite as claimed in claim 1, wherein the thermoplastic polymer is selected from the group consisting of nylon 6, polysulfones, polyethersulfones, aromatic polyetherimides, polyamidoimides, aromatic polyetherketones and aromatic polyesters.
5. A composite as defined in claim 1, wherein the silica fibers have diameters of from 2 to 50 nm.
6. A composite as defined in claim 1, wherein the silica fibers have a length to diameter ratio of from 10 to 200.
7. A composite as defined in claim 1, wherein the content of silica fibers in the composite is from 5 to 50% by volume.
8. A process for the preparation of a composite as claimed in claim 1, wherein silicic acids and/or esters of polysilicic acids are mixed homogeneously with the thermoplastic in an organic liquid phase, the amount of water which may be required for hydrolysis is added, and the mixture is heated at above 250° C. under the influence of a shear gradient of from 100 to 1000 $s^{-1}$.
9. A process as claimed in claim 8, wherein mixing of the components and hydrolysis are carried out in a high boiling polar organic solvent.
10. A process as defined in claim 8, wherein the mixture is heated to from 300° to 400° C.

* * * * *